United States Patent [19]
Barton

[11] 3,879,734
[45] Apr. 22, 1975

[54] DOPPLER RADIO NAVIGATION BEACON ANTENNA WITH WIDE AND UNEQUAL ELEMENT SPACING

[75] Inventor: Paul Barton, Bishops Stortford, England

[73] Assignee: International Standard Electric Corporation, New York, N.Y.

[22] Filed: Mar. 25, 1974

[21] Appl. No.: 454,106

[30] Foreign Application Priority Data
Apr. 5, 1973 United Kingdom............... 16275/73

[52] U.S. Cl.......................... 343/106 D; 343/108 M
[51] Int. Cl.............................................. G01s 1/38
[58] Field of Search..................... 343/106 D, 108 M

[56] References Cited
UNITED STATES PATENTS
3,728,729  4/1973  Overbury.................... 343/106 D X

*Primary Examiner*—Maynard R. Wilbur
*Assistant Examiner*—Richard E. Berger
*Attorney, Agent, or Firm*—William T. O'Neil

[57] ABSTRACT

A Doppler ground beacon system for use in navigation systems providing for air-derived angle data. The System includes a thinned array with wide but uneven element spacing and spacing proportional element commutation timing to avoid Doppler beat ambiguity without the need for a commutated reference array.

5 Claims, 8 Drawing Figures

DOPPLER RADIO NAVIGATION BEACON ANTENNA WITH WIDE AND UNEQUAL ELEMENT SPACING

BACKGROUND OF THE INVENTION

1. Field of the Invention

This invention relates generally to radio navigation beacons, and more particularly, to Doppler systems with commutated arrays.

2. Description of the Prior Art

In the patent literature, for example in British Pat. Nos. 1,225,190 and 1,234,541, linear array radio beacons are described in which a source of radio frequency energy is discretely and successively commutated to separate radiator elements of an array in order to simulate unidirectional or bi-directional constant velocity motion of the source. Navigational information is derived from these beacons as the Doppler shift of frequency is proportional to the cosine of the angle which a radio receiver of the system subtends with respect to the extension of the array line (apparent source motion vector).

Since the movement is simulated by the successive commutation of the R.F. source to adjacent elements of such a "Doppler" array, the spacing of the array elements is determined by the limiting phase transient which can be tolerated between successive samples of received signal at the remote receiving station. In general, this transient corresponds to a phase step or jump of 120° and, in the case where information is required over a wide angle, this may require adjacent elements in an array to be spaced as close as one-third wavelength.

The accuracy of such a Doppler navigation system is determined mainly by the array length and in the case of systems required to furnish angular information to an accuracy on the order of 0.01°, an array length as much as 120 wavelengths could be required. The realization of a Doppler navigation system requiring such accuracy over a wide sector would therefore involve the use of 360 radiator elements for the Doppler array beacon, with its associated commutator and cables, and such prolixity of equipment and opportunities for RF losses detract from the basic simplicity of the system.

The Doppler navigation system discussed above typically operates at a radio frequency of one or more GHz, and since the maximum Doppler frequency shift is of the order of a few KHz, it is necessary, in practice to use a reference antenna, at the ground beacon, which radiates a second radio frequency slightly offset from the commutated frequency, e.g., by 20KHz. The Doppler shift to the frequency of the moving component is then more readily detected as a change on the beat frequency between the moving component and the reference signal. Thus the indicated change of beat frequency, which bears the navigational information, is determined by the change of path difference between the paths corresponding to adjacent commutated radiating elements. With the fixed reference antenna of the above-described system, this change of path difference arises solely from the movement simulated by the commutated array.

In order to reduce the number of radiator elements required, the reference signal may be commutated along a small baseline array, to fill in the gaps between widely spaced, e.g., 4λ spaced radiator elements of the main array as described in U.S. Pat. No. 3,728,729. This arrangement typically allows a reduction from a total of 361 elements to 42 elements, for an array of the same baseline (120λ) and accuracy (0.01°), but does, however, require a commutated reference array in addition to the commutated main array. It is clearly advantageous to be able to use a single reference aerial in conjunction with a commutated main array having a reduced number of radiator elements, and it is to the solution of this problem that the present invention addresses itself.

SUMMARY OF THE INVENTION

According to the invention there is provided a radio navigation beacon including a fixed reference antenna for radiating energy at a first radio frequency, a linear array of irregularly spaced antenna elements, and means for commutating energy at a second radio frequency different from said first frequency to each of said radiating elements in turn, so as to produce a repetitive scan sequence such that the composite radiated signal is equivalent to that which would be obtained by sampling an equivalent but hypothetical constant speed source at unequal intervals of time.

The invention will be better understood from the ensuing description made in conjunction with the accompanying drawings.

DESCRIPTION OF THE PREFERRED EMBODIMENT

Figure 1:
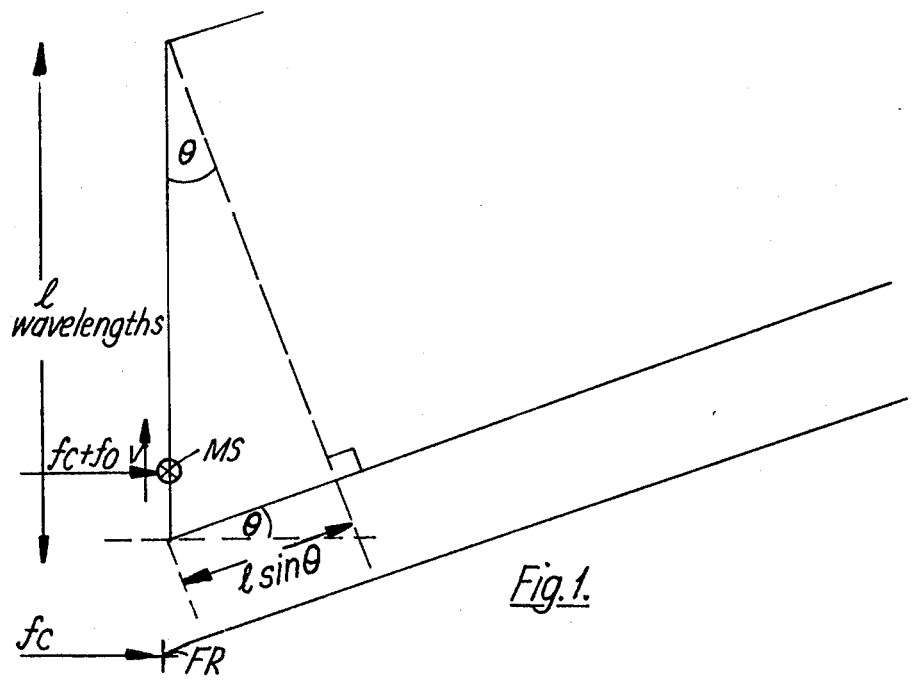
FIG. 1 shows the geometry of a Doppler scanned antenna system.

It is useful first to compare a radiating constant speed source MS scanning over a baseline equal in length to l wavelengths, with that of the commutated array under consideration. In FIG. 1, the moving source is identified as MS and the fixed reference antenna is FR.

Viewing the antenna system at an angle $\theta$ to the normal results in an observable Doppler shift of the frequency, $f$ carrier $+ f$ offset, $(f_c + f_o)$, radiated by the moving source of magnitude $v \sin \theta$ Hz, where the dimensions of $v$ are wavelengths per second. The signal, $f_c$, from the fixed reference antenna obviously does not experience this shift in frequency. Thus, at a far-field receiver, the interference between the two sources produces a beat frequency from the detector given by $$f_c + f_o + v \sin \theta - f_c = f_o + v \sin \theta.$$

The use of an offset frequency is required to give deviation sense, i.e., to avoid ambiguity between beat signals which represent positive angles and those which represent negative angles.

The data from which angle is determined is the $v \sin \theta$ term, and it is convenient in accordance with the foregoing, to subtract (mentally) the offset frequency from the beat signal expression, leaving $v \sin \theta$.

Figure 2:
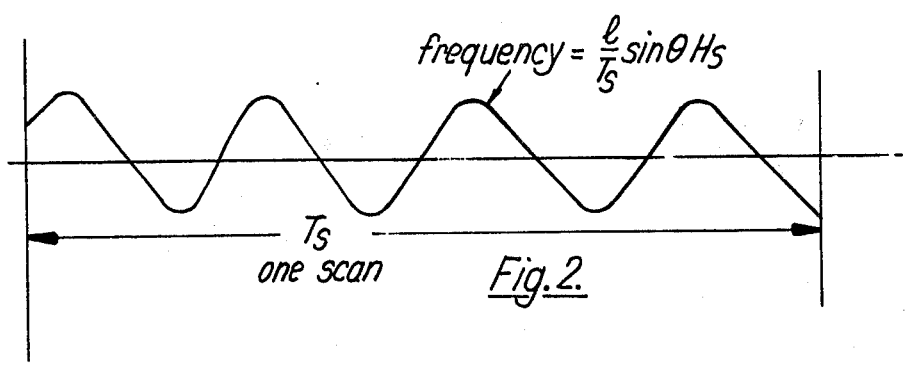
FIGS. 2 to 5 are waveforms (as identified) relating to operation of the scanned antenna system.

Each scan of the array marks out a phase trajectory whose slope varies directly with sin $\theta$. Consider the sinusoidal beat due to this phase progression. If the source takes $T_s$ seconds to move over its allotted baseline (l wavelengths), then $v = l/T_s$, and the beat sinusoid frequency $= (l/T_s) (\sin \theta)$, see FIG. 2.

Figure 3:
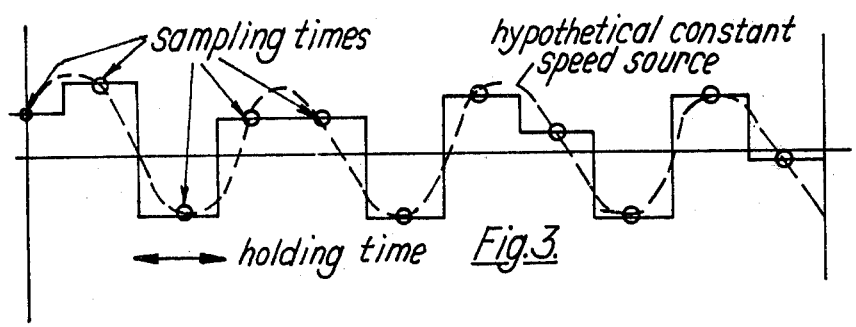

A uniformly spaced linear array of l wavelengths, commutated at a rate so that the scan is completed in $T_s$ seconds, produces a "sampled and held" version of the sinusoidal beat produced by a constant speed source, see FIG. 3.

As long as the sampling rate is high enough then the beat waveform is reconstitutable with the angle bearing information preserved.

This directly corresponds to restricting the phase step (jump) between antenna elements to less than 120° over the sector of coverage.

Figure 4:
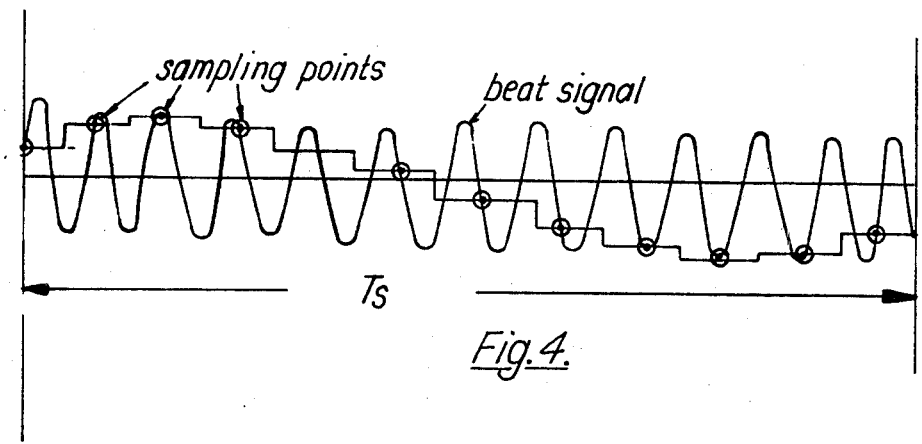

If a uniformly spaced array has wide spacing (>>120°), then ambiguity in the beat waveform will result at some angles, as indicated by the stepped line in FIG. 4.

The basic premise of the present invention is that, by providing an irregularity of spacing between the elements of the array, ambiguity of information can be avoided even though the average spacing may be too wide for a uniform spacing to be otherwise practicable. It is essentially an irregular sampling of the movement of a hypothetical constant speed source as depicted in the upper waveform of FIG. 5.

Figure 5:
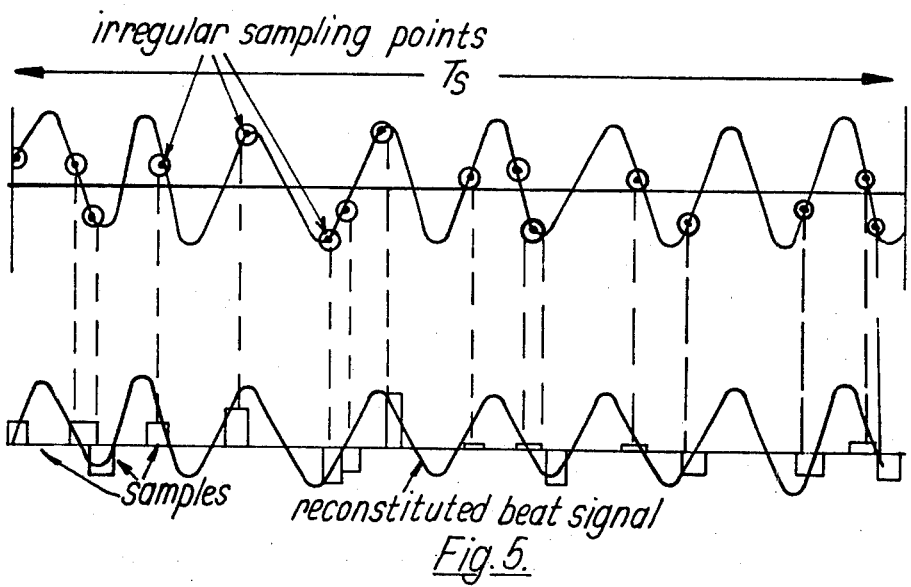

If each sample is of a constant duration then the transmission will be in bursts, and a narrow band filter is needed (at the receiver) to smooth out the signal and produce a reconstituted version of the required beat signal, as identified in the lower FIG. 5 waveform. This particular case is equivalent to a thinning process in a phased array, where it is known that incompletely filled (thinned) phased arrays can be designed which will concentrate power in one desired beam while keeping the sidelobe level down to a predetermined reasonable value.

It is not necessary to restrict the design of such transmissions to those cases which correspond with the thinned phased array. The duration of transmission from each element may be adjusted so that the total duty cycle of the transmission is higher.

Figure 6:
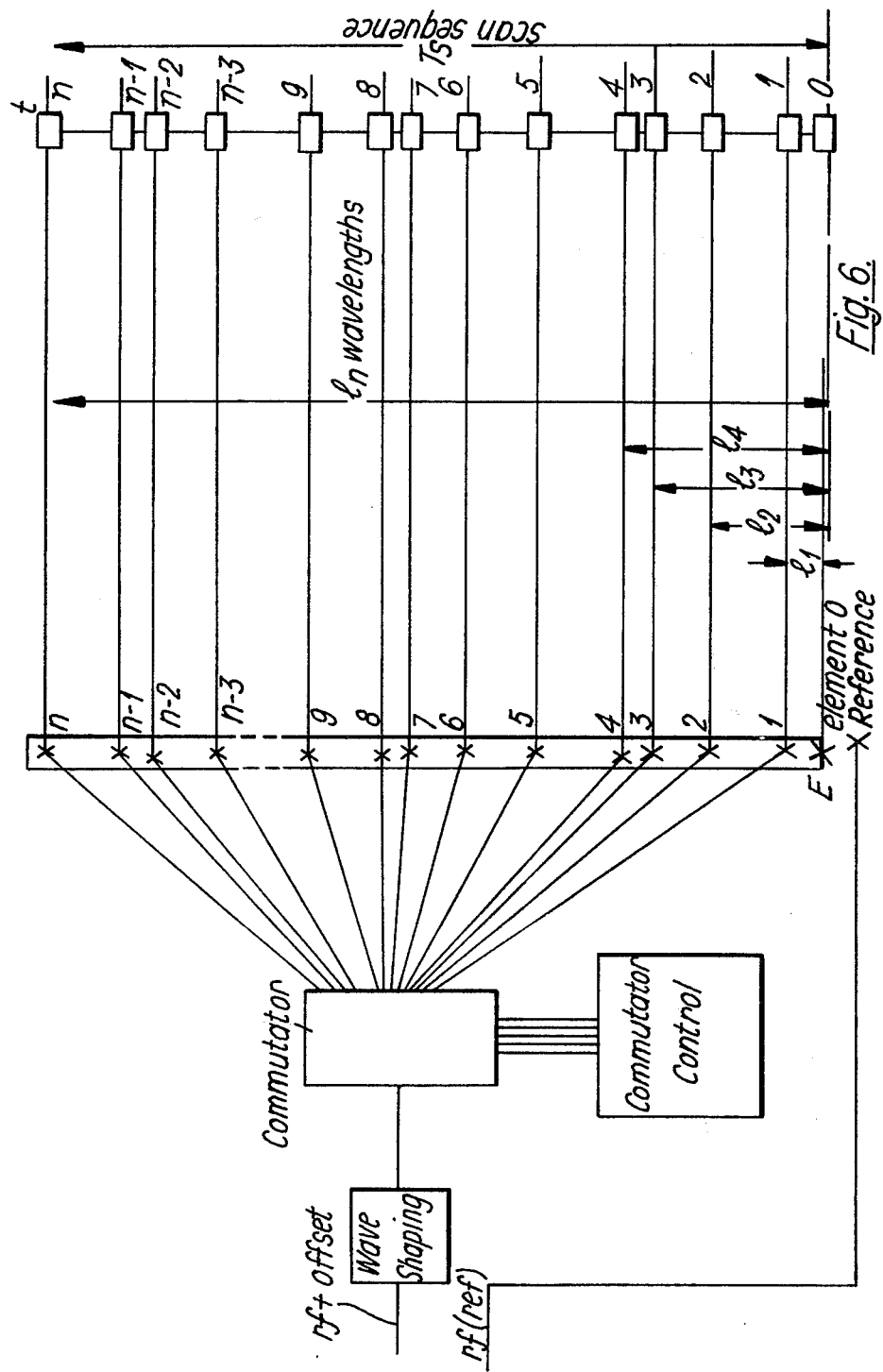
FIG. 6 is a block schematic diagram of a radio navigation beacon with irregularly spaced radiator elements according to the invention.

FIG. 6 is a block diagram showing a vertical array A of n irregularly spaced radiator elements 0, 1, 2, 3 etc., with a single fixed reference antenna, and associated commutator $C_1$, commutator control $C_2$, and wave shaping circuits WS. Element 0 is at the extreme end of the array (point E). Element 1 is $l_1$ wavelengths from E, element 2 is $l_2$ wavelengths from E, and so on. $l_n$ is the distance in wavelengths between the first and last (nth) elements, and is therefore the total baseline of the array.

The fact that the movement of a corresponding constant speed source is being sampled demands that the point in time midway through the transmission for each radiating element, measured in relation to the start of scan, must correspond directly with its position in the array. That is, the drive to the commutator is arranged such that element 0 is excited at the start of the scan, element 1 is on at $(l_1/l_n) (T_s)$ seconds after the start of scan, element 2 is on at $(l_2/l_n) (T_s)$ seconds after the start of scan, and so on.

The composite signal is equivalent to that obtained by sampling the equivalent but hypothetical constant speed source at unequal intervals of time. The element distribution function for the linear array is such that the average spacing is larger than that required by a uniformly spaced array for the required coverage. The irregularity of the element spacing does, however, eliminate or substantially reduce the formation of grating lobes in this region to allow a receiver to resolve unambiguously the Doppler shift over the whole range.

A special case occurs when the spacing law is nonuniform but symmetrical about the center of the array. This arrangement makes for easier understanding of the spectrum produced, but is in no way a necessary feature of any such spacing law.

Figure 7:
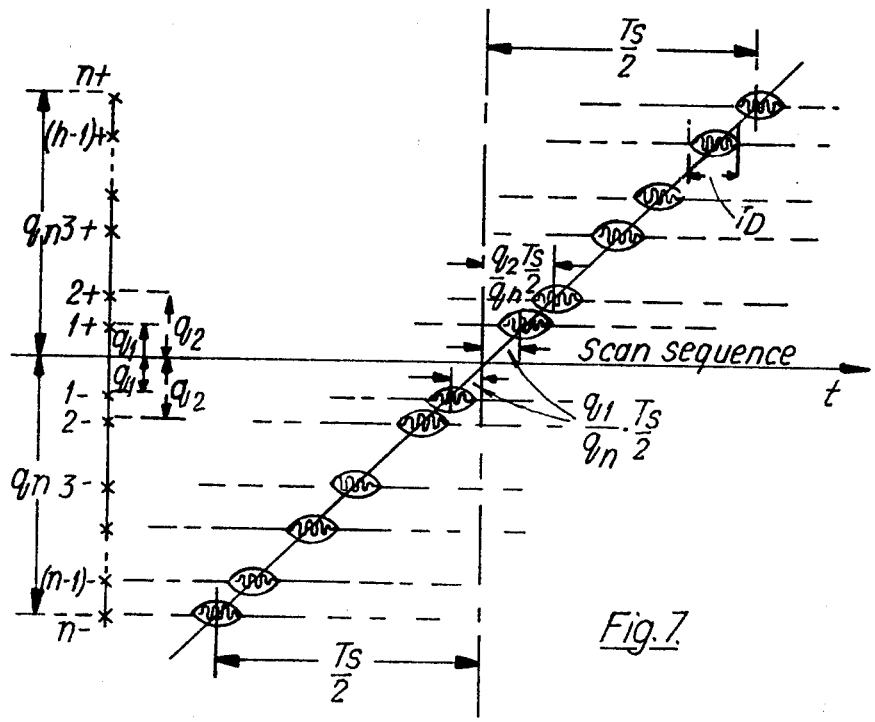
FIG. 7 shows an alternative arrangement of radiator spacing.

As shown in FIG. 7, a length $q_n$ wavelength is associated with two elements, one displaced above the center by $q_n$, and the other displaced below center by this same amount.

The scanning sequence for this configuration is as follows:

| Element Number | Time during scan when ON |
|---|---|
| n— | $-\frac{1}{2}T_s$ |
| (n—1)— | $-\frac{1}{2}T_s(q_{n-1}/q_n)$ |
| (n—2)— | $-\frac{1}{2}T_s(q_{n-2}/q_n)$ |
| . | . |
| 2— | $-\frac{1}{2}T_s(q_2/q_n)$ |
| 1— | $-\frac{1}{2}T_s(q_1/q_n)$ |
| 1+ | $+\frac{1}{2}T_s(q_1/q_n)$ |
| 2+ | $+\frac{1}{2}T_s(q_2/q_n)$ |
| . | . |
| (n—2)+ | $+\frac{1}{2}T_s(q_{n-2}/q_n)$ |
| (n—1)+ | $+\frac{1}{2}T_s(q_{n-1}/q_n)$ |
| n+ | $=\frac{1}{2}T_s$ |

Figure 8:
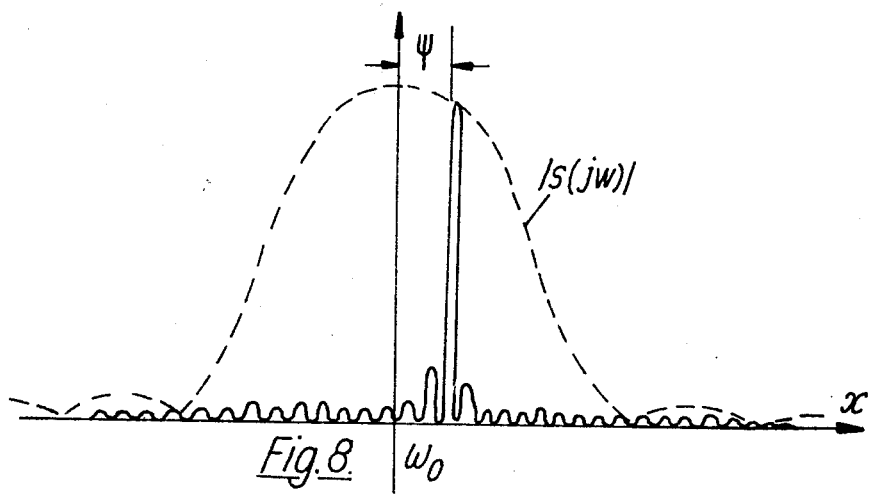
FIG. 8 illustrates the spectrum of the arrangement of FIG. 7.

Each element of the array, when excited, transmits a pulse of r.f. energy of fixed duration $T_D$, with amplitude taper along the array for spectrum conservation If
$x = (\omega-\omega_o)T_s/2q_n$
$\psi = 2\pi \sin \theta$
$\omega_o =$ offset frequency
$T_s =$ scan time
and
$S(j\omega) =$ overall envelope due to taper applied to each element of the array, then the scan spectrum is given by $(2S/j\omega) [\cos q_1 (x-\psi)+\cos q_2(x-\psi)+ \ldots + \cos q_n(x-\psi) ]$ With sufficient irregularity in the spacing law given by $q_1, q_2$ etc., the spectrum only peaks at $x = \psi$, that is, $$\frac{(\omega-\omega_o)T_s}{2q_n} = \psi = 2\pi \sin \Theta$$

or, the Doppler shift $(f-f_o) = (l \sin \theta/T_s)$, where
l is the total baseline in wavelengths $= 2q_n$. See FIG. 8.

$\psi$ is the desired Doppler beat frequency, coherent grating lobes having thus been replaced by "randomized" sidelobes.

A tracking filter selects this center of spectrum and is designed with a bandwidth narrow enough to continue ringing during the dead periods in transmission.

A zero crossing counter can be used to measure the Doppler shift, as has already been done in the prior art. The dwell time on each element may be adjusted so as to partially or completely fill the dead periods in transmission, thereby effecting some increase in duty cycle.

With the above described use of an irregular spacing of elements along a linear Doppler array with wide average spacing, in conjunction with a fixed reference source, and with a suitable scan sequence (i.e., one which is equivalent to sampling a filled array of the same baseline at unequal times during the scan) an array having a baseline of 120 wavelengths and an accuracy of 0.01° may be realized with some 40 to 70 irregularly spaced elements, and with a single fixed reference antenna.

It is to be understood that the foregoing description of specific examples of this invention is made by way of example only and is not intended as a limitation on the scope of the invention. The drawings and description are typical and illustrative only.

What is claimed is:

1. A radio navigation beacon of the Doppler type comprising;

a fixed reference aerial for radiating energy at a first radio frequency;

a linear array of irregularly spaced radiating elements, and means for commutating energy at a second radio frequency different from said first frequency to each of said aerials in turn so as to produce a repetitive scan sequence, said sequence being selected such that the composite radiated signal is equivalent to that which would be obtained by sampling an equivalent but hypothetical constant speed source at unequal intervals of time.

2. Apparatus according to claim 1 in which said second radio frequency is commutated to each radiating element of said array so that the point in time midway through the commutation period of each said element, measured in relation to the start of the scan, corresponds directly with the relative position from the beginning element, of the respective radiator as a fraction of the total array length.

3. Apparatus defined in claim 2 in which the commutation period to each radiating element is of the same duration.

4. Apparatus according to claim 2 in which the commutation period to each radiating element is of variable duration such as to at least partially fill dead periods of transmission between commutations.

5. Apparatus according to claim 1 in which the elements of the array are spaced symmetrically about the center of the array.

* * * * *